United States Patent [19]

Weber et al.

[11] 4,378,028
[45] Mar. 29, 1983

[54] QUICK CONNECT COUPLING

[75] Inventors: Richard C. Weber, Hudson; Richard J. Medvick, Shaker Heights, both of Ohio

[73] Assignee: Swagelok Company, Hudson, Ohio

[21] Appl. No.: 253,097

[22] Filed: Apr. 13, 1981

[51] Int. Cl.³ ............................................. F16L 37/28
[52] U.S. Cl. .......................... 137/614.05; 137/614.04; 251/149.6; 251/361; 251/363
[58] Field of Search .................. 137/614.04, 614.05; 251/361, 363, 149.6

[56] References Cited

U.S. PATENT DOCUMENTS

| | | | |
|---|---|---|---|
| 966,390 | 8/1910 | Elder | 251/361 |
| 1,499,107 | 6/1924 | Haynes | 251/149.6 |
| 1,523,575 | 1/1925 | Beloit | 251/361 |
| 2,135,221 | 11/1938 | Scheiwer | 284/19 |
| 2,135,222 | 11/1938 | Scheiwer | 284/19 |
| 2,377,812 | 6/1945 | Scheiwer | 285/169 |
| 2,428,637 | 10/1947 | Scheiwer | 284/19 |
| 2,428,638 | 10/1947 | Scheiwer | 284/19 |
| 2,744,770 | 5/1956 | Davidson et al. | 285/169 |
| 2,797,110 | 6/1957 | Covington | 285/86 |
| 3,174,508 | 3/1965 | Zahuranec | 137/614.04 |
| 3,236,251 | 2/1966 | Hansen | 137/614.05 |
| 3,280,834 | 10/1966 | Zahuranec | 137/612.1 |
| 3,330,529 | 7/1967 | Hansson | 251/149.6 |
| 3,378,225 | 4/1968 | Snyder, Jr. | 251/149.6 |
| 3,643,695 | 2/1972 | Strah et al. | 137/614.04 |
| 3,729,023 | 4/1973 | Hammond | 137/614.03 |
| 3,777,771 | 12/1973 | De Visscher | 137/1 |
| 4,040,442 | 8/1977 | Alexandre | 251/361 |
| 4,114,853 | 9/1978 | Medvick | 251/149.6 |
| 4,182,370 | 1/1980 | Karcher | 137/614.04 |

FOREIGN PATENT DOCUMENTS 1291752 10/1972 United Kingdom .

*Primary Examiner*—A. Michael Chambers
*Attorney, Agent, or Firm*—Fay & Sharpe

[57] ABSTRACT

An improved quick connect tube coupling which allows one design for the male coupling portion to be used in either single or double end shut-off applications. A new opening means for the valve located in the female coupling portion is provided for single end shut-off applications and a new valving arrangement located in the male coupling portion is provided for double end shut-off applications. An improved valve seat construction disposed in the female coupling portion is also advantageously provided.

10 Claims, 8 Drawing Figures

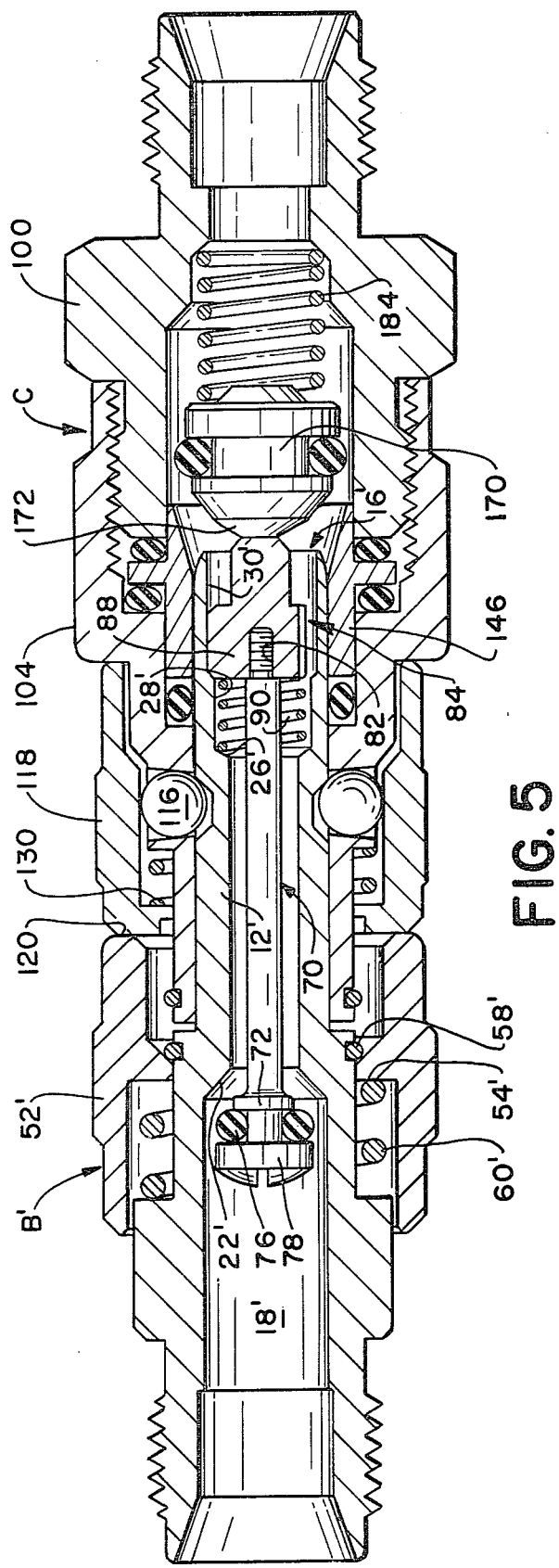

QUICK CONNECT COUPLING

BACKGROUND OF THE INVENTION

This invention pertains to the art of fluid fittings and more particularly, to quick connect tube couplings having a male coupling portion and an associated female coupling portion capable of engagement with or disengagement from one another.

The invention specifically relates to a tube coupling construction capable of either single or double end shut-off capabilities. However, it will be readily appreciated by those skilled in the art that the invention has broader applications and may be used in other environments or applications.

One type of quick connect coupling which has found substantial commercial success is disclosed in U.S. Pat. No. 3,174,508 to Zahuranec. The construction there shown, however, is limited to a double end shut-off coupling where the coupling structure is not readily convertible to use in single end shut-off applications. Indeed, in order to convert the basic construction disclosed in the 3,174,508 patent from double end to single end shut-off use, it was necessary to provide separate male coupling portion components having particular design characteristics. This, in turn, necessitated that a greater number of male coupling portions be inventoried to properly accommodate customer needs.

It has, therefore, been considered particularly desirable to develop an improved quick connect tube coupling construction wherein a common male coupling portion would be provided in conjunction with a female coupling portion. The male coupling portion should have the capability of use in either single or double end shut-off applications without the necessity for performing any separate or special machining operations.

The subject invention is considered to meet the foregoing needs and others to thereby provide an improved quick connect construction.

BRIEF DESCRIPTION OF THE INVENTION

The subject improvement is for a quick connect coupling arrangement of the type having a hollow male stem portion selectively receivable in and retained by a hollow female coupling body. The female body includes a first valve member which is moved from a closed to an open position by opening means at the forward end of the male portion at coupling make-up. The male portion is designed and configured to facilitate use in either single end or double end shut-off applications. In the latter case, the male portion includes a second valve member which is moved to an opened condition in conjunction with the first valve member at coupling make-up.

More particularly, in the general type of quick connect coupling involved, the female coupling body is comprised of a pair of longitudinally interfitting coupling body portions having a valve seat member operatively interposed therebetween. The first valve member is continuously urged by spring biasing means toward a sealing relationship with the seat member and is moved away from the seat member against the force of the biasing means by engaging or opening means associated with a male stem on the male coupling portion which is received in the female body. The seat member has a generally cylindrical body with a first end spaced toward the first valve member and an opposed second end face spaced toward the male stem. The first end face tapers inwardly into the interior of the cylindrical body to define a seat area for the first valve member and further includes a circumferential flange extending radially outward thereof intermediate the first and second ends. This flange is disposed intermediate internal shoulder areas of the interfitted female body portions and with at least axial sections of the cylindrical body extending axially beyond these internal shoulders in opposite directions from each other. A seal member extends circumferentially of the seat member body at each of the opposed sides or faces of the flange and sealingly communicates between an adjacent female body portion shoulder and the flange. The first valve member has a generally cylindrical conformation with a forward end area spaced toward the valve seat and a larger diameter rear end area, the two being separated from one another by an intermediate area. The intermediate area includes a seal member extending circumferentially thereof and the rear end area includes guide means for the spring biasing means. The cylindrical body of the seat member has some predetermined internal diameter with the first valve member forward end area dimensioned for selective receipt thereinto with the rear end area engaging the seat area.

In accordance with another aspect of the invention, the coupling is of the single end shut-off type and the hollow male stem includes an innermost terminal end received in the male coupling body. The engaging or opening means comprises a pair of interfitted protrusion members extending axially outward of this terminal end. Each protrusion member has a planar body including opposed side edges with a longitudinal slot extending from one end edge toward the other. The protrusion members are positioned so that the slot in each member is received over the unslotted portion in the other member so as to define a generally X-shaped structure in transverse cross-section.

According to another aspect of the invention, the coupling is of the double end shut-off type wherein the hollow male stem has a tapered seat and includes a second valve member therein movble out of and into sealing engagement with the tapered seat area in response to assembly and disassembly of the male stem from a female coupling body. This second valve member has an elongated shaft portion including a valve head at one end engageable with the seat area and a guide portion at the other end having a plurality of radially disposed vanes. These vanes extend toward the internal wall of the hollow male stem in a sliding relationship therewith adjacent the inner terminal end thereof. The guide portion also includes an engaging or opening means which extends therefrom axially outward from the male stem terminal end. Spring means cooperate between a shoulder in the hollow male stem and the guide portion to apply a biasing force for continuously urging the valve head toward sealing engagement with the valve seat and for moving the engaging means axially outward of the male stem inner terminal end.

The principal object of the present invention is the provision of an improved quick connect tube coupling.

Another object is the provision of such a coupling where the basic male and female coupling components are readily adapted to either single or double end shut-off applications.

Still another object of the invention is the provision of an improved quick connect tube coupling having an improved valve arrangement in the female coupling body and an improved valve arrangement for use in the male coupling portion when utilized in double end shut-off applications.

Still other objects and advantages for the invention will become readily apparent to those skilled in the art upon a reading and understanding of the following specification.

BRIEF DESCRIPTION OF THE DRAWINGS

The invention may take physical form in certain parts and arrangements of parts, preferred embodiments of which will be described in detail in this specification and illustrated in accompanying drawings which form a part hereof and wherein:

FIG. 5 is a cross-sectional view generally similar to FIG. 4 showing a double end shut-off coupling with the male and female coupling portions joined and locked;

FIG. 6 is an exploded perspective view of the valve engaging or opening means utilized in the embodiment of FIG. 2;

FIG. 7 is an end view of the guide and support member utilized in the arrangement of FIG. 3 and taken from the right side of that FIGURE; and, FIG. 8 is an end view of the hollow cylindrical valve seat included in the female coupling portion taken from the right side of FIG. 4.

DETAILED DESCRIPTION OF THE INVENTION

Figure 1:
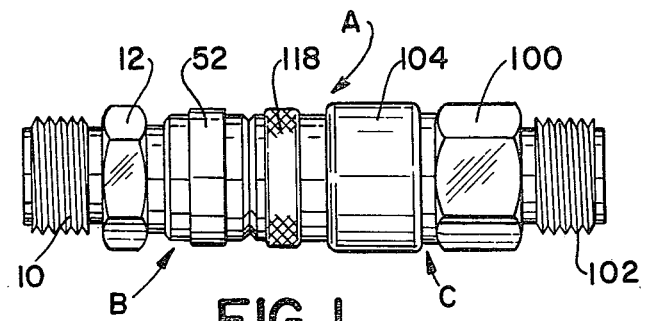
FIG. 1 is a side elevational view of a quick connect tube coupling formed in accordance with the present invention.

Referring now to the drawings wherein the showings are for purposes of illustrating preferred embodiments of the invention only and not for purposes of limiting same, FIG. 1 shows a quick connect tube coupling A comprised of a male coupling portion B and a female coupling portion C which are interfitted in a locked relationship with each other.

Figure 2:
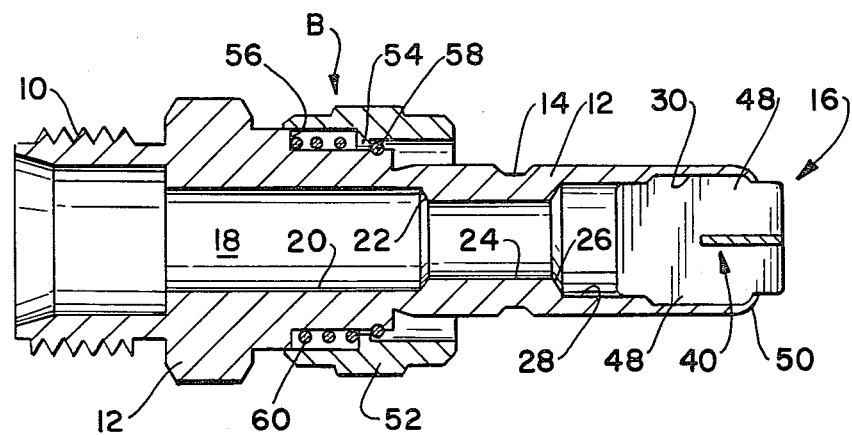
FIG. 2 is a cross-sectional view of the male coupling portion when it is to be used in a single end shut-off application.

More particularly and with reference to FIGS. 1 and 2, male coupling portion B includes a threaded area 10 at the outermost end thereof for securing it to a tube (not shown) in a conventional manner by means known to those skilled in the art. The male portion is also provided with an elongated tubular stem portion 12 at the end opposite from threads 10. A peripheral groove 14 having sloping side walls is formed in the outer wall of stem portion 12 and wherein the stem portion includes an inner terminal end 16.

Male coupling portion B is hollow and includes an elongated passageway 18 extending between the opposed ends thereof. This passageway, in turn, includes an enlarged bore 20 having a tapered surface 22 at the forward end area thereof which merges into a smaller bore 24 extending along tubular stem portion 12. Tapered area 22 acts to define a valve seat for double end shut-off applications as will become apparent hereinafter. The inner end area of bore 24 adjacent terminal end 16 includes an outwardly tapering area 26 communicating with an enlarged axial bore portion 28 which, in turn, communicates with still further enlarged axial portion 30 terminating at inner end 16. Bore portion 30 is adapted to receive a valve opening means generally designated 40.

FIG. 6 best shows valve opening means 40 as comprising a pair of substantially identical planar halves 42,44. Each half includes a slot area 46 extending inwardly along the longitudinal axis from one end edge to approximately the center area thereof. In addition, protrusions or extensions 48 extend outwardly from each of the opposed side edges for reasons and purposes to be described. Halves 42,44 are received over each other at slotted areas 46 so as to define a generally X-shaped configuration in transverse cross-section. As seen in FIG. 2, this X-shaped configuration is received in bore portion 30 of passage 18. Protrusions or extensions 48 are dimensioned so as to be closely received in the bore with the inner end edges thereof engaging the area of interface between bore portions 28,30. Also, the axial dimension of extensions 48 is such that they terminate a slight distance axially inward from terminal end 16. The terminal end is then formed as shown in FIG. 2 so as to closely embrace these ends as at flange 50 and thereby positively retain valve opening means 40 in bore portion 30. A short section of opening means 40 extends outwardly of stem terminal end 16 and functions in a manner which will become apparent hereinafter.

Referring again to FIG. 2, male coupling portion B includes generally cylindrical sleeve 52 having an internal rim or shoulder 54 extending therearound. The coupling body includes an outwardly extending shoulder 56 with a retaining ring 58 being axially spaced therefrom and disposed about the coupling body for cooperating with flange 54 to define a first or normal position for sleeve 52. A compression spring 60 is operatively received intermediate shoulders 54,56 and continuously acts to bias sleeve 52 axially of the male coupling portion toward a position where sleeve flange 54 engages retaining ring 58.

Figure 3:
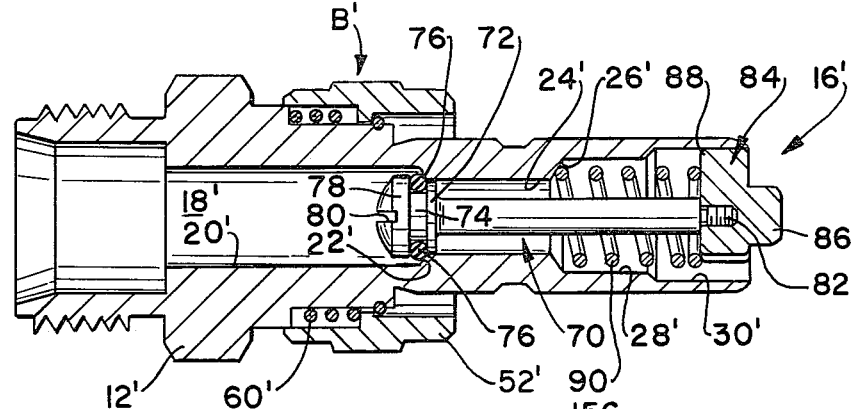
FIG. 3 is a view similar to FIG. 2 but including a valve member therein for a double end shut-off application.

FIG. 3 shows a male coupling portion which is identical to that shown in FIG. 2 except that it is adapted for a double end shut-off application. For ease of illustration and appreciation of certain additional components utilized, like components are identified with like numerals with a primed (') suffix and new components are identified by new numerals.

In that FIGURE, male coupling portion B' includes an elongated valve core generally designated 70 extending through axial portion 24' of passageway 18'. A first end portion 72 is disposed at one end of the core and has a diameter greater than that of the core but slightly smaller than the diameter of bore portion 24' to facilitate selective axial receipt therein. A circumferential groove 74 is disposed immediately adjacent first end portion 72 and receives an O-ring 76. This O-ring is dimensioned so that when the valve core is moved to its forwardmost position, it will sealingly engage tapered seat area 22. A second end portion 78 is disposed adjacent groove 74 and has an outer diameter generally the same as the O-ring outside diameter to thereby provide O-ring backup. A slot 80 is included in the second end portion to accommodate selective installation or removal of the valve core from association with male coupling portion B' when and as may be desired.

The opposite or inner end of core 70 is threaded as at 82 for purposes of threadedly receiving a guide and support member generally designated 84. Member 84 includes a forwardmost nose portion 86 which defines an engaging or opening means and a plurality of radial ribs 88 rearwardly adjacent thereto. A compression spring 90 is operably interposed between guide end support member 84 and tapered area 26' of passageway 18. FIG. 7 shows an end view of member 84 from the right side of FIG. 3 and as will there be noted, nose portion 86 is generally cylindrical with three ribs 88 being equidistantly spaced apart from each other. Ribs 88 are dimensioned such that they effectively define an outside diameter which is only slightly less than the inside diameter of bore axial portion 30' at male stem inner terminal end 16'.

As shown in FIG. 3, valve core 70 is in a closed position under the influence of compression spring 90 so that O-ring 76 is moved into sealing engagement with tapered seat area 22'. In this condition, nose portion 86 extends axially outward of terminal end 16' for engagement with a valve member disposed in a female coupling portion as will be described.

Figure 4:
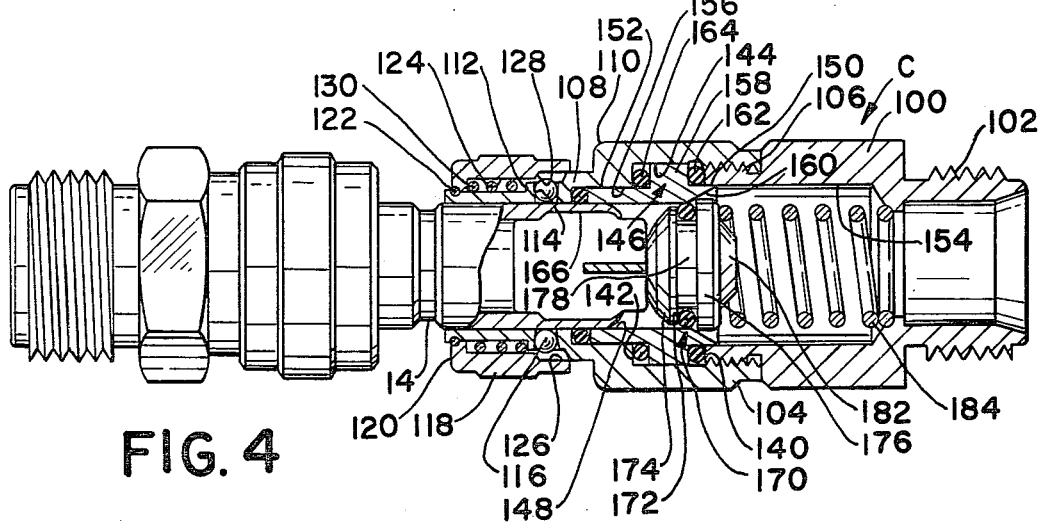
FIG. 4 is a partial cross-sectional view showing a single end shut-off coupling with the male and female coupling portions joined but not locked.

FIG. 4 shows the single end shut-off male coupling portion B of FIG. 2 in a partially joined but unlocked condition with female coupling portion C. With regard to the female coupling portion, it includes a hollow female body 100 having an externally threaded area 102 at one end thereof for attachment to a tube (not shown) by conventional means known in the art. A substantially tubular body extension 104 is rigidly mounted to body 100 on the end thereof opposite from threads 102. In the preferred arrangement, such rigid mounting is effected as at threads 106, although an integral construction or swaged connection could also be advantageously employed. Body extension 104 includes a central portion 108 which defines a pair of axially spaced apart external radial shoulders 110,112. Central portion 108 further includes a plurality of radially tapered ball detent receiving openings 114 formed therein. These openings are circumferentially disposed about the central portion with each opening being frusto-conical in shape with the minimum diameters being less than the diameters of ball detents 116 which are disposed therein and such that the balls project slightly into the bore of body extension 104 for ultimate engagement with peripheral groove 14 of male coupling portion B. At the same time, the ball detents are restrained from falling inwardly through openings 114 when the coupled male and female coupling portions are uncoupled from each other.

For purposes of retaining ball detents 116 in openings 114, a sleeve 118 is advantageously provided. This sleeve has a radially directed flange 120 adjacent the end of body extension 104 in an abutting relationship with a retaining ring 122 disposed thereat. Sleeve 118 includes a bore portion 124 adjacent flange 120 which is slightly larger in diameter than the radially adjacent section of body extension central portion 108 for slidable clearance thereover in the area of detent receiving openings 114. An enlarged bore portion 126 is provided in sleeve 118 adjacent the end thereof opposite flange 120 for clearance of a slightly enlarged section of central portion 108 axially between detent receiving openings 114 and shoulder 110. Thus, sleeve 118 may be selectively moved axially of central portion 108 so that the end of the sleeve is in a closed spaced relationship with shoulder 110.

A tapered camming surface 128 extends between bore portion 124,126. In coupling and uncoupling male and female coupling portions A,B, tapered camming surface 128 acts to cam ball detents 116 into or out of engagement with groove 14 in tubular male stem portion 12. A compression spring 130 normally urges sleeve 118 axially of central portion 108 into the detent releasing position shown in FIG. 4.

With continued reference to FIG. 4, an end of female body 100 and an internally stepped area on body extension 104 define a pair of axially spaced apart radial flanges or shoulders 140,142, respectively, which are externally bounded by a portion 144 of the internal opening through body extension 104. A hollow, generally cylindrical valve seat member 146 is interposed between shoulders 140,142, as shown. The seat member includes an inner cylindrical surface 148 and outer cylindrical surface portions 150,152 which closely mate with inner cylindrical surface areas 154,156 of body 100 and body extension 104, respectively. An outwardly extending radial flange 158 separates outer surface portion 150,152 of the seat member and is located between shoulders 140,142. A tapered seat area 160 (FIGS. 4 and 8) extends from outer surface portion 150 toward inner surface 148 to provide a seat for a valve member in a manner to be described.

An O-ring 162 is received between shoulder 140 and one side of flange 158 and another O-ring 164 is received between shoulder 142 and the other side of flange 158. Yet another O-ring 166 is captured between the forward end face of seat member 146 and a flange or shoulder area on body extension 104. This O-ring is dimensioned so as to sealingly receive tubular stem portion 12 of male coupling portion B therethrough in a manner which will be appreciated hereinafter. In the preferred arrangement here under discussion, valve seat member 146 is machined from a metal such as brass or stainless steel. These materials are particularly desirable for most coupling applications although it is possible to employ other materials without departing from the overall intent of the invention.

A generally cylindrical valve member 170 is received in female body 100 for selective cooperation with seat member 146 between opened and closed conditions. Valve member 170 includes a forward portion 172 having a generally tapered forward face 174. Forward portion 172 has a diameter slightly less than the diameter of inner surface 148 so that it may be axially received therein. A valve member rear portion 176 has a diameter slightly larger than the inside diameter of seat member 146 so that it may selectively engage tapered seat area 160 when the valve is closed. A groove 178 intermediate the forward and rear portions receive an O-ring 180. When the valve is closed, this O-ring is disposed in a sealing relationship generally at the intersection of the seat area 160 and inner surface 148 in the manner shown by FIG. 4. A rear protrusion 182 is received by and locates valve member 170 relative to a compression spring 184. This compression spring operatively communicates between a rear wall in female body 100 and the valve member itself for continuously urging the valve member toward the closed condition shown in FIG. 4.

In the single end shut-off arrangement of FIG. 4, male coupling portion B is received by female coupling portion C in a manner similar to that disclosed in U.S. Pat. No. 3,174,508. That is, as the male coupling portion is inserted, valve opening means 40 engages valve member 170 to urge the valve member rearwardly against the biasing force of spring 184 and away from sealing engagement with seat member 146. At the same time, a camming action as between ball detents 116, sleeve 118 and sleeve 152 occurs as is described in U.S. Pat. No. 3,174,508 and which is incorporated herein by reference. When locked together, i.e., when ball detents 116 are received in peripheral groove 14 of tubular stem portion 12, valve member 170 will be opened to allow fluid flow between male and female coupling portions B,C as well as their associated tubes.

The generally X-shaped configuration of valve opening means 40 as described above readily accommodates fluid flow axially of passage 18 through open terminal end 16. This particular relationship eliminates the need for any cross drilled holes of the type employed in U.S. Pat. No. 3,174,508 to thereby facilitate a more direct fluid flow path and a closely spaced relationship as between the outer surface of stem portion 12, O-ring 166 and seat member 146. Seat member flange 158 along with O-rings 162,164 provide improved sealing characteristics in the area of communication between the seat member, body 100 and body extensions 104. When male and female body portions B,C are uncoupled, valve member 170 is urged to a fluid blocking relationship with seat member 146 under the influence of compression spring 184.

FIG. 5 shows the male coupling portion B' described with reference to FIG. 3 as it has been fully joined to female coupling portion C just described in FIG. 4. In this arrangement, the biasing force of compression spring 184 is designed to be greater than the biasing force of compression spring 90. As a result, when nose portion 86 engages forward portion 172 of valve member 170, valve core 70 will be urged rearwardly in male coupling portion B so that first portion 72 and O-ring 76 are moved away from cooperation with tapered seat 22'. When radial ribs 88 are moved axially to a point where they engage the area of interface between bore portion 28',30', the valve is fully opened. In this position, nose portion 86 still extends outwardly from stem terminal end 16' to accommodate fluid flow into passage 18' at that area. Thereafter, further insertion of male coupling portion B into female coupling portion C causes valve member 170 to be axially moved away from sealing engagement with valve seat 146 against the biasing force of compression spring 184.

In the condition shown in FIG. 5, system fluid flows between coupling portions B',C and their respective tubes, by again entering passage 18' of male coupling portion B' at open inner terminal end 16'. The advantageous fluid flow relationship as well as the advantageous relationship between seat member 146 and male stem portion 12' as described above are also achieved here. When male and female coupling portions B',C are disconnected and separated from each other, O-ring 76 adjacent first end portion 72 of valve core 70 is moved into a sealing relationship with seat area 22' under the influence of spring 90 and valve member 170 is urged to a fluid blocking relationship with seat member 146 under the influence of compression spring 184. This then prevents fluid flow outwardly through either of fitting portions B',C.

The subject improved design advantageously provides a new male coupling portion B,B' which is readily adapted to use in either single end (FIGS. 3 and 4) or double end (FIGS. 3 and 5) sut-off applications. The particular new male coupling portion design involved allows both types of shut-off capabilities to be achieved by using the same basic male coupling body or component. This result is considered to be highly advantageous from manufacturing and inventory standpoints. Moreover, the capability for allowing fluid flow axially through male coupling portions B,B' from open terminal ends 16,16' thereof is considered highly advantageous and allows a better cooperative relationship to be achieved as between seat member 146 in the female coupling portion and tubular stem portions 12,12' of the single and double end shut-off male coupling portions. Finally, the design of seat member 146 itself is considered to be an improvement over prior seat designs utilized in this general type of quick connect coupling in that better sealing is obtained between seat member 146 and the female coupling body components.

The invention has been described with reference to the preferred embodiments. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. In a quick connect coupling of the type having a hollow male steam longitudinally receivable in and selectively retained by a hollow female coupling body and wherein said female coupling body is comprised of a pair of longitudinally interfitting female coupling body portions having a valve seat member operatively interposed therebetween with a first valve member in said female coupling body being continuously urged by a first spring biasing means toward a sealing relationship with said seat member and being moved away from said seat member against the force of said first biasing means by opening means associated with said male stem when said male stem is received in said female coupling body and longitudinally moved toward a retained relationship therewith, the improvement comprising:

said valve seat member having a hollow generally cylindrical body with a first end spaced toward said first valve member and an opposed second end axially spaced therefrom, said first end including a surface tapering inwardly into the interior of said cylindrical body for defining a frusto-conical valve seat area, said cylindrical body further having a radially outward extending flange circumferentially thereof intermediate said first and second ends and disposed intermediate a pair of opposed shoulders at an interfitting area between said female coupling body portions, the length of said cylindrical body being such that sections thereof extend axially beyond said shoulders in opposite directions from each other; a seal member extending circumferentially of said cylindrical seat member disposed intermediate each of the opposed sides of said flange and the adjacent one of said shoulders; and, said first valve member having a generally cylindrical conformation with a forward end portion spaced toward said seat member and having an outside diameter at least slightly less than the inside diameter of said hollow seat member so as to be selectively received therein when said first valve member is in a closed condition, said first valve member further including a rear end portion having a diameter greater than said forward end portion and separated therefrom by an intermediate portion wherein said rear portion further includes guide means for said first biasing means and said intermediate portion includes a seal member extending circumferentially thereof, the diameter of at least said rear end portion being greater than the inside diameter of said seat member for being urged toward engagement with said tapered seat area when said male stem is withdrawn from association with said female coupling body and said first valve member is thereby moved to said closed condition under the influence of said first biasing means.

2. The improvement as defined in claim 1 wherein said seat member is constructed from metal and said body sections are dimensioned to be closely received in those areas of the female coupling body portion bores adjacent said shoulders.

3. The improvement as defined in claim 1 wherein said coupling is of a single end shut-off type and said hollow male stem includes an inner terminal end received in said female coupling body, said opening means comprising a pair of interfitted planar members received in and extending axially outward from said terminal end, each of said planar members having a body portion including opposed end edges and opposed side edges with a slot extending generally coaxial of the body portion from one end edge toward the other, said body portions being positioned so that the slot in each one is received over the unslotted portion in the other so as to define a generally X-shaped structure in transverse cross section.

4. The improvement as defined in claim 3 wherein the side edges of said body portions include stop means cooperating with spaced apart retaining areas internally of said hollow male stem for retaining said opening means axially positioned in said male stem.

5. The improvement as defined in claim 4 wherein said stop means comprises extension areas disposed along said body portion side edges intermediate said end edges, said hollow male stem having a smaller internal diameter at said terminal end than the effective diametral extent of said opening means across said extension areas for defining one of said retaining means.

6. The improvement as defined in claim 1 wherein said coupling is of a double end shut-off type and said hollow male stem includes a valve seat portion therein tapering inwardly toward a stem inner terminal end which is received in said female coupling body; a second valve member received in said hollow male stem movable out of and into sealing engagement with said seat portion in response to assembly and disassembly of said male stem in said female coupling body, said second valve member having an elongated core portion including a valve head at one end cooperable with said seat portion and a guide portion at the other end adjacent said male stem terminal end with said guide portion including guide means cooperating in a sliding relationship with the internal wall of said hollow male stem; said opening means comprising a protrusion on said guide portion extending generally axially outward from said male stem terminal; and, second spring biasing means cooperating between said hollow male steam and said guide portion for continuously applying a biasing force against said second valve member for urging said valve head toward sealing engagement with said valve seat portion while simultaneously urging said opening means further outwardly from said male stem terminal end.

7. The improvement as defined in claim 6 wherein one of said valve head and guide portions is threadedly secured to said core portion to facilitate selective removal of said second valve member from said hollow male stem.

8. The improvement as defined in claim 6 wherein said hollow male stem includes an internal shoulder axially spaced from and facing said terminal end, said second biasing means from and facing said terminal end, said second biasing means having one end thereof engaging said shoulder.

9. The improvement as defined in claim 8 wherein said hollow male stem includes a second internal radial shoulder axially spaced from said first shoulder toward said terminal end, said second shoulder having a larger inside diameter than said first shoulder and defining stop means for said guide portion, said guide means engaging said stop means when said second valve member is moved some predetermined axial distance inwardly of said male stem in response to said opening means engaging said first valve member as said male stem is inserted into said female coupling body.

10. The improvement as defined in claim 6 wherein said guide portion comprises a central body and said guide means comprises a plurality of vanes extending radially from said central body at equidistantly spaced intervals therearound, said vanes each having an outer terminal edge extending axially of said core portion.

* * * * *